(12) United States Patent
Ren et al.

(10) Patent No.: US 8,183,787 B2
(45) Date of Patent: May 22, 2012

(54) POWER SUPPLY SYSTEMS WITH CONTROLLABLE POWER

(75) Inventors: Zhimou Ren, Chengdu (CN); Jun Ren, Chengdu (CN); Yunning Xie, Chengdu (CN); Tiesheng Yan, Chengdu (CN); Feng Lin, Chengdu (CN)

(73) Assignee: O2Micro, Inc, Santa Clara, CA (US)

( * ) Notice: Subject to any disclaimer, the term of this patent is extended or adjusted under 35 U.S.C. 154(b) by 202 days.

(21) Appl. No.: 12/718,210

(22) Filed: Mar. 5, 2010

(65) Prior Publication Data
US 2011/0133661 A1 Jun. 9, 2011

(51) Int. Cl.
*H05B 41/36* (2006.01)
*H05B 41/14* (2006.01)
(52) U.S. Cl. .................. 315/209 R; 315/200 R
(58) Field of Classification Search .......... 315/291, 315/307, 224, 200 R, 209 R, 193, 186
See application file for complete search history.

(56) References Cited

U.S. PATENT DOCUMENTS

| | | | |
|---|---|---|---|
| 7,091,871 B2 * | 8/2006 | Howell et al. | 340/649 |
| 2007/0159750 A1 * | 7/2007 | Peker et al. | 361/93.1 |
| 2008/0068298 A1 * | 3/2008 | Shen et al. | 345/46 |
| 2009/0187925 A1 * | 7/2009 | Hu et al. | 719/327 |
| 2009/0295776 A1 * | 12/2009 | Yu et al. | 345/212 |
| 2010/0033146 A1 * | 2/2010 | Irissou et al. | 323/282 |

* cited by examiner

*Primary Examiner* — Douglas W Owens
*Assistant Examiner* — Minh D A

(57) ABSTRACT

A power supply system includes a power converter, a switch, and a controller. The power converter is operable for providing power to a load. The switch is coupled to the power converter and is operable for adjusting the power to the load. The switch has a gate, a source and a drain. The controller is coupled to the switch and is operable for controlling a state of the switch. The controller has a first control terminal for providing a gate voltage to the gate of the switch, a second control terminal for providing a source voltage to the source of the switch, and an input terminal for receiving a supply voltage via the source of the switch. The controller is also operable for limiting the supply voltage within a predetermined maximum level by regulating the gate voltage to a preset level.

20 Claims, 4 Drawing Sheets

US 8,183,787 B2

POWER SUPPLY SYSTEMS WITH CONTROLLABLE POWER

BACKGROUND

A power supply system for powering a load usually includes a controller to control an amount of power from the power supply system to the load. In some conventional power supply systems, the controller is powered directly by a relatively high voltage, e.g., ranged from 120V to 400V. Thus, the controller may need to be manufactured with a relatively high withstand voltage, e.g., up to 500V, which increases the cost and the power consumption.

In some other conventional power supply system, e.g., a power supply system 100 illustrated in FIG. 1, a transformer 110 is used to convert a relatively high input voltage $V_{IN}$, e.g., ranged from 120V to 400V, to a relatively low output voltage, e.g., 15V or 20V. As shown in FIG. 1, the transformer 110 includes a primary winding 102, a secondary winding 104, and an auxiliary winding 106. A controller 130 is powered by the auxiliary winding 106. By controlling a switch 140 coupled to the primary winding 102, the controller 130 can receive a desired amount of power from the auxiliary winding 106. The range of the operating voltage for the controller 130 can be relatively low, e.g., ranged from 9V to 40V. Thus, the controller 130 does not need to have a relatively high withstand voltage.

At the beginning of the operation when the power supply system 100 is enabled, the switch 140 is off, and therefore the transformer 110 does not provide power to the controller 130. Instead, a capacitor 114 coupled to the controller 130 can provide power to the controller 130. Specifically, when the power supply system 100 is enabled, the capacitor 114 is charged by the input voltage $V_{IN}$ via a start-up resistor 112. A voltage $V_{CC}$ on the capacitor 114 starts to increase. When the voltage $V_{CC}$ increases to a voltage threshold $V_{CCon}$, e.g., 15V, the controller 130 starts to operate, e.g., to turn the switch 140 on and off alternately. As such, a voltage $V_{106}$ across the auxiliary winding 106 starts to increase. When the voltage $V_{106}$ across the auxiliary winding 106 increases to a level such that the diode 118 is forward biased, e.g., when the voltage $V_{106}$ is greater than the voltage $V_{CC}$ plus the forward-bias-conducting voltage $V_{118}$ of the diode 118, the transformer 110 can power the controller 130. However, a current $I_{OP}$ flowing from the capacitor 114 to the controller 130 may be greater than a current $I_{112}$ flowing from the start-up resistor 112 to the capacitor 114, and therefore the voltage $V_{CC}$ on the capacitor 114 decreases. Consequently, if the voltage $V_{CC}$ decreases to another voltage threshold $V_{CC(min)}$, e.g., 8V, before the voltage $V_{106}$ across the auxiliary winding 106 increases to be greater than the voltage $V_{CC}$ plus the forward-bias-conducting voltage $V_{118}$, the controller 130 is disabled.

In order to prevent the controller 130 from being disabled, the amount of charges stored in the capacitor 114 needs to be relatively large. In other words, the capacitor 114 has a relatively high capacitance, e.g., 100 μF. Thus, the time for the controller 130 to start up, e.g., the time for the voltage $V_{CC}$ to increase from 0V to the voltage threshold $V_{CCon}$, e.g., 15V, is relatively long. In addition, the size of the transformer 110 is relatively large, thereby increasing the size of the printed circuit board (PCB) for the power supply system 100.

SUMMARY

In one embodiment, a power supply system includes a power converter, a switch, and a controller. The power converter is operable for providing power to a load. The switch is coupled to the power converter and is operable for adjusting the power to the load. The switch has a gate, a source and a drain. The controller is coupled to the switch and is operable for controlling a state of the switch. The controller has a first control terminal for providing a gate voltage to the gate of the switch, a second control terminal for providing a source voltage to the source of the switch, and an input terminal for receiving a supply voltage via the source of the switch. The controller is also operable for limiting the supply voltage within a predetermined maximum level by regulating the gate voltage to a preset level.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a power supply system operable for supplying power to a load. A controller is operable for adjusting the amount of the power to the load by controlling a switch coupled to the load. In addition, the switch can adjust a supply voltage of the controller to a relatively low level. Thus, the controller does not need to be manufactured with relatively high withstand voltage. Moreover, the transformer used in the conventional power supply system is omitted, and thus saving the cost of the power supply system. The power supply system can be used in various applications, such as display devices, illuminating devices, etc.

Figure 1:
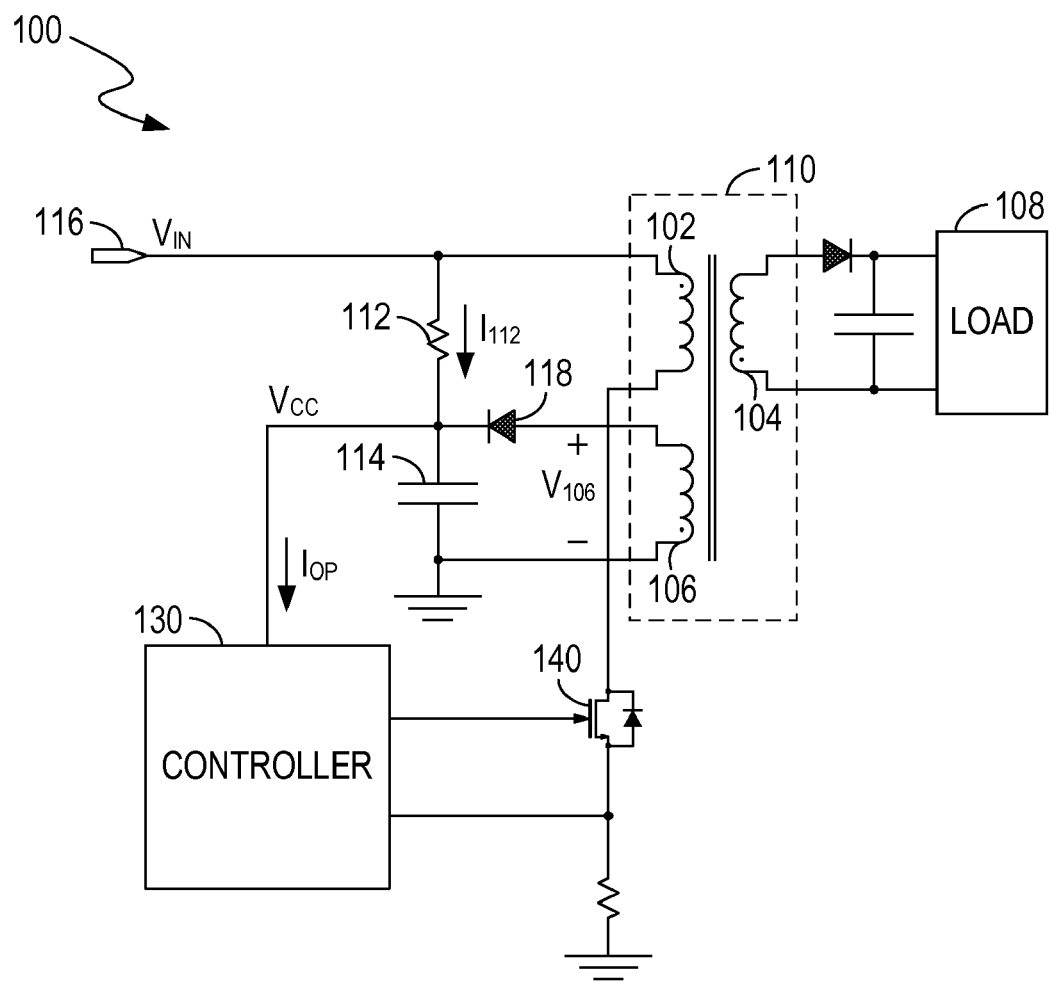
FIG. 1 illustrates a circuit diagram of a power supply system, in accordance with the prior art.
Figure 2:
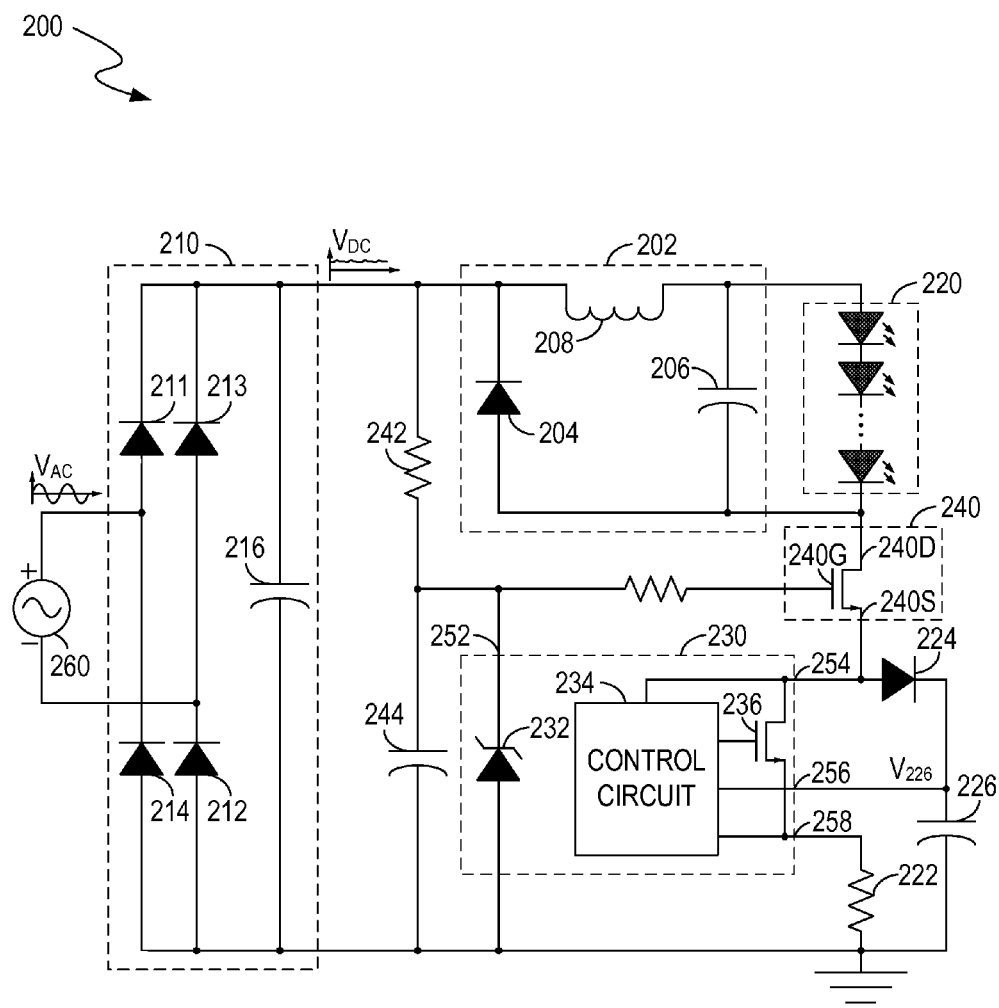
FIG. 2 illustrates a circuit diagram of an example of a power supply system, in accordance with one embodiment of the present invention.

FIG. 2 illustrates an example of a circuit diagram of a power supply system 200, in accordance with one embodiment of the present invention. In one embodiment, the power supply system 200 includes an AC/DC converter 210, a DC/DC converter 202, a switch 240, and a controller 230. The AC/DC converter 210 converts an AC voltage $V_{AC}$ to a DC voltage $V_{DC}$. The converter 202 receives the DC voltage $V_{DC}$ and provides power to a load 220. By way of example, the load 220 can include one or more light sources such as a set of light emitting diodes (LEDs). The controller 230 controls the amount of the power to the load 220.

In one embodiment, the AC/DC converter 210 includes a rectifier, e.g., a full-bridge circuit that includes diodes 211, 212, 213, and 214. The full-bridge circuit 211-214 is coupled to an AC voltage source 260 and converts the AC voltage $V_{AC}$ that has two polarities to an output voltage having one polarity. The AC/DC converter 210 further includes a filter circuit, e.g., a capacitor 216. As such, the AC/DC converter 210 can converter the AC voltage $V_{AC}$ to a pulsating DC voltage $V_{DC}$.

The converter 202 includes an inductor 208 coupled in series between the load 220 and an output terminal of the AC/DC converter 210. The converter 202 further includes a diode 204 for forming a uni-directional current path. The converter 202 may also include a capacitor 206 for filtering an inductor current $I_{208}$ flowing through the inductor 208 such that a DC current flows through the load 220.

In operation, when a switch 240 and a switch 236 are turned on, the load 220 is coupled to ground via the switches 240 and 236. The diode 204 is reverse biased. The load 220 receives power from the AC/DC converter 210 via the inductor 208. The inductor 208 also stores energy from the AC/DC converter 210. When the switch 236 is turned off, the diode 204 is forward biased. Thus, the energy stored in the inductor 208 is transferred to the load 220. An inductor current $I_{208}$ of the inductor 208 increases when the switch 236 is turned on and decreases when the switch 236 is turned off.

The controller 230 controls the power to the load 220 by controlling the switch 236 and the switch 240. In the example of FIG. 2, the controller 230 has a control terminal 254, a control terminal 252, a sense terminal 258, and a power input terminal 256. The control terminals 252 and 254 control the state of the switch 240. The sense terminal 258 senses a signal, e.g., a voltage across a sense resistor 222, indicative of a current $I_{220}$ flowing through the load 220. The power input terminal 256 receives supply power. An energy storage element such as a capacitor 226 is coupled to the power input terminal 256. The controller 230 includes a control circuit 234 to control the switch 236 according to a sense signal indicative of the current through the load 220, thereby adjusting the power to the load 220. The control circuit 230 generates a control signal, e.g., a pulse-width modulation (PWM) signal to turn on or off the switch 236. For example, when the PWM signal is logic high, the switch 236 is turned on. When the PWM signal is logic low, the switch 236 is turned off.

In one embodiment, the switch 240, e.g., a metal-oxide-semiconductor field-effect transistor, includes a drain 240D coupled to the converter 202 and the load 220, a source 240S coupled to the control terminal 254 of the controller 230, and a gate 240G coupled to the control terminal 252 of the controller 230. The controller 230 controls the state of the switch 240 by providing a preset voltage $V_{PRS}$ to the gate 240G of the switch 240 and varying the voltage at the source 240S of the switch 240, in one embodiment. The voltage at the source 240S of the switch 240 can be changed by changing the status of the switch 236. In other words, the controller 230 is operable for controlling the state of the switch 240 by controlling a state of the switch 236. In the example of FIG. 2, the controller 230 includes a Zener diode 232 providing a preset voltage $V_{PRS}$ to the gate 240G of the switch 240. Thus, the preset voltage $V_{PRS}$ is equal to an inverse-breakdown voltage of the Zener diode 232. However, the invention is not limited to the example of FIG. 2. The controller 230 can include a reference circuit such as a current mirror to provide the preset voltage $V_{PRS}$ to the gate 240G.

The source 240S of the switch 240 is coupled to the switch 236 and the sense resistor 222. Moreover, the source 240S of the switch 240 is coupled to a diode 224 and the capacitor 226. When the switch 236 is on, the diodes 204 and 224 are reverse-biased and the switch 240 is on. Thus, the current $I_{220}$ of the load 220 flows through the switch 240, the switch 236, the sense resistor 222 and to ground. The controller 230 is powered by the capacitor 226 via the power input terminal 256.

When the switch 236 is turned off, the source voltage $V_S$ of the switch 240 can increase to a level such that the diode 224 is forward-biased. The diode 204 is also forward-biased. In one embodiment, the switch 240 is on because the source voltage $V_S$ that is equal to the capacitor voltage $V_{226}$ plus the forward-bias-conducting voltage $V_{DIODE}$ is less than the gate voltage $V_G$ minus the voltage threshold $V_{TH}$ of the switch 240. Thus, the switch 240 transfers some power from the load 220 to the controller 230 and to charge the capacitor 226. In other words, a first portion of the load current $I_{220}$ flows through the capacitor 226 to charge the capacitor 226, and flows in the power input terminal 256 to power the controller 230. A second portion of the load current $I_{220}$ flows through the diode 204 and the inductor 208. Compared with the current flowing through the diode 204 and the inductor 208, the current flowing through the capacitor 226 and the power input terminal 256 is relatively small. The capacitor voltage $V_{226}$ increases as being charged. In one embodiment, the capacitor voltage $V_{226}$ increases until the capacitor 226 enters a steady state. In the steady state, the capacitor 226 is neither charged nor discharged, such that the voltage $V_{226}$ can be substantially constant. The switch 240 remains on in the steady state. Thus, in one embodiment, the controller 230 receives a rated current $I_R$ from the capacitor 226 when the switch 236 is on, and receives the rated current $I_R$ from the switch 240 when the switch 236 is off. The rated current $I_R$ of the controller 230 can be substantially constant. Compared with a current $I_{220}$ through the load 220, the rated current $I_R$ of the controller 230 can be relatively small.

In another embodiment, when the switch 236 is turned off, if the voltage $V_{226}$ increases to a level that is equal to the gate voltage $V_G$ minus the threshold voltage $V_{TH}$ and the forward-bias-conducting voltage $V_{DIODE}$, e.g., $V_G - V_{TH} - V_{DIODE}$, the switch 240 is turned off. In this instance, the capacitor 226 is discharged to power the controller 230 via the power input terminal 256 if both the switches 236 and 240 are off. When the capacitor voltage $V_{226}$ decreases below a certain level, e.g., $V_{226} < V_G - V_{TH} - V_{DIODE}$, the switch 240 is turned on again. Therefore, by maintaining the gate voltage of the switch 240 at a preset level $V_{PRS}$, the voltage $V_{226}$ across the capacitor 226 has a predetermined maximum level $V_{MAX}$, e.g., $V_{MAX} = V_{PRS} - V_{TH} - V_{DIODE}$. In other words, the voltage at the power input terminal 256 is limited within a predetermined maximum level $V_{MAX}$. By way of example, if the preset level $V_{PRS}$ is equal to 17V, the voltage threshold $V_{TH}$ is equal to 2V, and the forward-bias-conducting voltage $V_{DIODE}$ is equal to 0.3V, then the voltage at the power input terminal 256 has a maximum level $V_{MAX}$ of 14.7V. Advantageously, the controller 230 does not need to be manufactured with relatively high withstand voltage.

The control circuit 234 can further adjust a duty cycle of the PWM signal according to a sense signal indicative of a load current $I_{220}$ through the load 220. The sense signal can be a voltage $V_{222}$ across the sense resistor 222. In one embodiment, the load 220 includes a set of light emitting diodes (LEDs). By controlling the duty cycle of the PWM signal based on the sense signal, the control circuit 234 can adjust a current flowing thought the set of LEDs 220 to a desired level. More specifically, when the PWM signal is in a first state, e.g., logic high, the switch 240 is turned on, such that the inductor current $I_{208}$ increases. When the PWM signal is in a second state, e.g., logic low, the switch 240 can be turned off, such that the inductor current $I_{208}$ decreases. In one embodiment, if the sense signal $V_{222}$ indicates that the load current $I_{220}$ is greater than a current reference $I_{REF}$, the control circuit 234 reduces the duty cycle of the PWM signal, so as to reduce the load current $I_{220}$. If the sense signal $V_{222}$ indicates that the load current $I_{220}$ is less than the current reference $I_{REF}$, the control circuit 234 increases the duty cycle of the PWM signal, so as to increase the load current $I_{220}$. As such, the load current $I_{220}$ can be adjusted to the current reference $I_{REF}$ by adjusting the duty cycle of the PWM signal generated by the control circuit 234. Thus, the LEDs 220 can project a light with a desired intensity/brightness.

The control circuit 234 and the switch 236 can be integrated into a single chip. The control circuit 234 is able to monitor the load current $I_{220}$ by sensing a drain-source voltage $V_{236DS}$ of the switch 236. More specifically, when the control circuit 234 turns on the switch 236, the control circuit 234 can control the switch 236 to operate in the ohmic (linear) region. The control circuit 234 compares the drain-source voltage $V_{236DS}$ of the switch 236 with a reference. For example, if the drain-source voltage $V_{236DS}$ increases to a voltage reference $V_{OCP}$ indicating an over-current condition of the load current $I_{220}$, the control circuit 234 can turn off the switch 236 to decrease the load current $I_{220}$. Thus, the power supply system 200 and the load 220 are protected.

Furthermore, the power supply system 200 includes a capacitor 244 coupled between the gate 240G and ground, and a start-up resistor 242 coupled between the capacitor 244 and the output terminal of the AC/DC converter 210. When the power supply system 200 is enabled, the capacitor 244 is charged by the pulsating DC voltage $V_{Dc}$ via the start-up resistor 242, such that a voltage $V_{244}$ on the capacitor 244 increases. The voltage $V_{244}$ on the capacitor 244 can increase relatively fast because there is no current flowing to the gate 240G or the control terminal 252. The capacitance of the capacitor 244 can be relatively low, e.g., 100 nF.

The switch 240 is turned on if the voltage $V_{244}$ increases to the voltage threshold $V_{TH}$ of the switch 240. When the switch 240 is on, the capacitor 226 is charged by the current $I_{240}$ flowing through the switch 240, and the voltage $V_{226}$ at the power input terminal 256 increases. During a start-up operation, the current $I_{240}$ through the switch 240 to the capacitor 226 is relatively large, such that the supply voltage $V_{226}$ on the capacitor 226 can increase relatively fast. When the voltage $V_{226}$ increases to an operating threshold $V_{CCon}$ of the controller 230, the controller 230 is enabled. Advantageously, the controller 230 can start up relatively fast. Furthermore, since the transformer in the conventional power supply system is omitted, the size of the printed circuit board (PCB) for the power supply system 200 is reduced.

Figure 3:
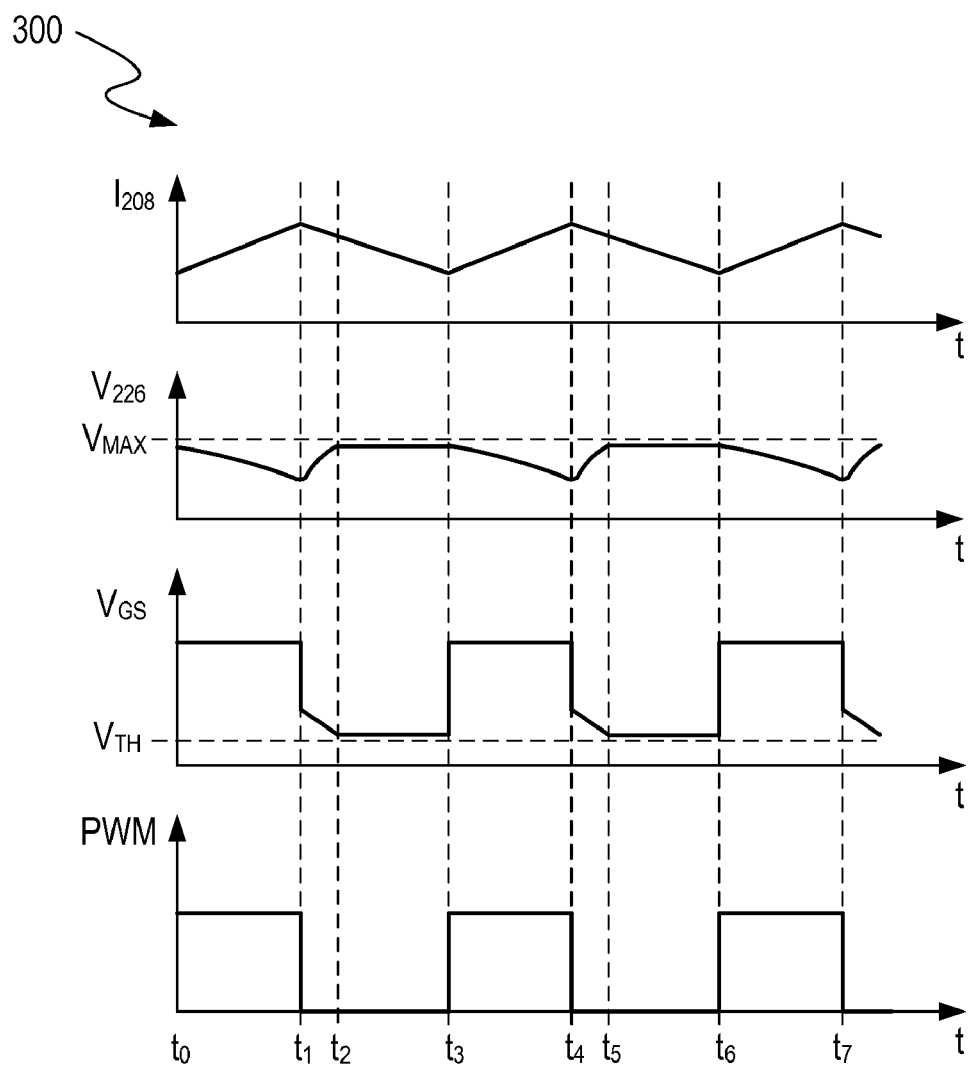
FIG. 3 illustrates examples of plots for waveforms of signals associated with a power supply system and a corresponding status of a switch in the power supply system, in accordance with one embodiment of the present invention.

FIG. 3 illustrates examples of plots for waveforms of the PWM signal generated by the control circuit 234, the inductor current $I_{208}$, the voltage $V_{226}$ across the capacitor 226, and the corresponding status of the switch 240, in accordance with one embodiment of the present invention. FIG. 3 is described in combination with FIG. 2.

As shown in FIG. 3, when the PWM signal is logic high, e.g., from time $t_0$ to $t_1$, the switch 236 and the switch 240 are turned on. More specifically, a gate-source voltage $V_{GS}$ of the switch 240 is greater than the voltage threshold $V_{TH}$ of the switch 240, and a difference between the gate-source voltage $V_{GS}$ and the voltage threshold $V_{TH}$ can be relatively large. Thus, the switch 240 is fully on. The capacitor voltage $V_{226}$ decreases because the capacitor 226 is discharged to the controller 230. Moreover, the inductor current $I_{208}$ of the inductor 208 increases. When the PWM signal is logic low, e.g., from time $t_1$ to $t_3$, the switch 236 is turned off. At time $t_1$, the gate-source voltage $V_{GS}$ of the switch 240 can drop to a level that is equal to the gate voltage $V_G$ minus the capacitor voltage $V_{226}$ and minus the forward-bias-conducting voltage $V_{DIODE}$. During time $t_1$ to $t_2$, the gate-source voltage $V_{GS}$ of the switch 240 can decrease until the capacitor 226 enters a steady state. The capacitor voltage $V_{226}$ increases during time $t_1$ to $t_2$ because the capacitor 226 is charged via the switch 240. In the steady state from time $t_2$ to $t_3$, the gate-source voltage $V_{GS}$ of the switch 240 is slightly greater than the voltage threshold $V_{TH}$ of the switch 240, such that the switch 240 transfers a rated current $I_R$ to the controller 230. In addition, the capacitor voltage $V_{226}$ can remain substantially constant because the capacitor 226 is neither charged nor discharged. The capacitor voltage $V_{226}$ is lower than the maximum level $V_{MAX}$. In other words, the supply voltage at the power input terminal 256 has the maximum level $V_{MAX}$. Furthermore, when the PWM signal is logic low, e.g., from time $t_1$ to $t_3$, the inductor current $I_{208}$ can decrease.

Figure 4:
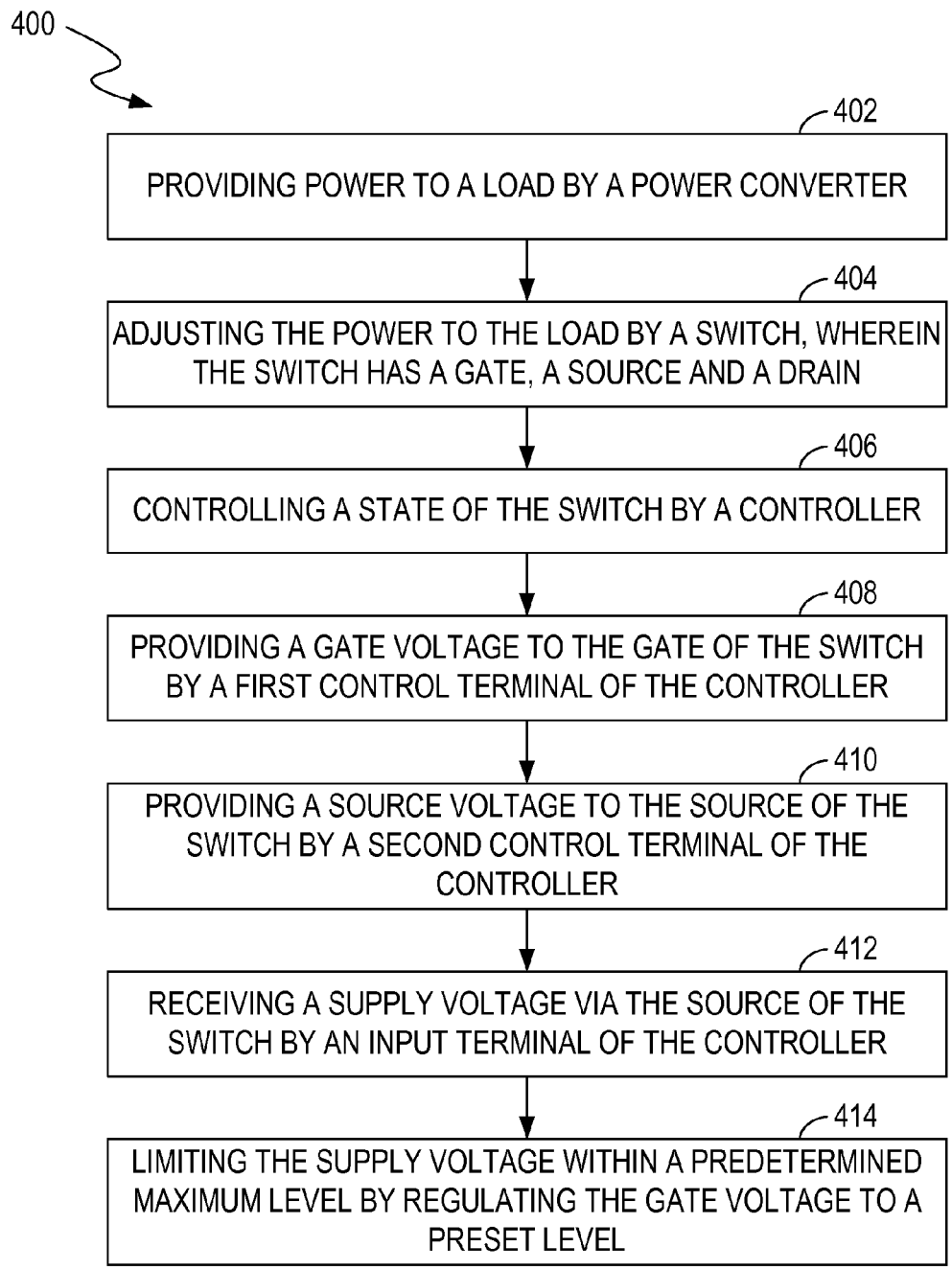
FIG. 4 illustrates a flowchart of examples of operations performed by a power supply system, in accordance with one embodiment of the present invention.

FIG. 4 illustrates a flowchart 400 of examples of operations performed by the power supply system 200, in accordance with one embodiment of the present invention. FIG. 4 is described in combination with FIG. 2 and FIG. 3.

In block 402, the power converter 202 provides power to a load 220. The load 220 can include one or more light sources such as a set of LEDs. In block 404, the switch 240 can adjust the power to the load 220. The switch 240 includes a gate 240G, a source 240S, and a drain 240D. In block 406, the controller 230 controls the state of the switch 240. In one embodiment, the control circuit 234 controls the state of the switch 240 by controlling the state of the switch 236. The control circuit 234 can generate a PWM signal to control the switch 236. The control circuit 234 can further adjust a duty cycle of the PWM signal according to a sense signal, e.g., $V_{222}$, indicative of the current $I_{220}$ through the load 220.

In block 408, the controller terminal 252 of the controller 230 can provide a gate voltage $V_G$ to the gate 240G of the switch 240. In block 410, the controller terminal 254 of the controller 230 can provide a source voltage $V_S$ to the source 240S of the switch 240. In block 412, the input terminal 256 of the controller 230 can receive a supply voltage $V_{226}$ via the source 240S of the switch 240.

In block 414, the controller 230 can limit the supply voltage $V_{226}$ within a predetermined maximum level $V_{MAX}$ by regulating the gate voltage $V_G$ to a preset level $V_{PRS}$. In one embodiment, the gate voltage $V_G$ is regulated to the preset level $V_{PRS}$ by a Zener diode. The predetermined maximum level $V_{MAX}$ is proportional to the preset level $V_{PRS}$, e.g., $V_{MAX} = V_{PRS} - N_{TH} - N_{DIODE}$.

In addition, when the switch 236 is on, the current $I_{220}$ through the load 220 can be transferred to ground via the switch 236. When the switch 236 is off and the switch 240 is on, a portion of the current $I_{220}$ can charge the capacitor 226 that is coupled to the input terminal 256 and the switch 240. When the switch 236 is on, the capacitor 226 can be discharged to power the controller 230 via the input terminal 256. If both the switches 236 and 240 are off, the capacitor 226 can also be discharged to power the controller 230 via the input terminal 256.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A power supply system comprising:
    a power converter operable for providing power to a light emitting diode (LED);
    a first switch coupled to said power converter and operable for adjusting said power to said LED, wherein said first switch has a gate, a source and a drain; and
    a controller coupled to said first switch and operable for controlling a state of said first switch, wherein said controller has a first control terminal for providing a gate voltage to said gate of said first switch, a second control terminal for providing a source voltage to said source of said first switch, and an input terminal for receiving a supply voltage via said source of said first switch, wherein said controller comprises a second switch coupled to said first switch, and comprises a control circuit coupled to said second switch and operable for controlling said state of said first switch by controlling a state of said second switch, and wherein said controller is operable for limiting said supply voltage within a predetermined maximum level by regulating said gate voltage to a preset level.

2. The power supply system as claimed in claim 1, wherein said controller has a sense terminal for sensing a current through said LED.

3. The power supply system as claimed in claim 1, wherein said controller comprises a Zener diode coupled to said gate of said first switch and for regulating said gate voltage to said preset level.

4. The power supply system as claimed in claim 1, wherein said control circuit generates a pulse-width modulation (PWM) signal for controlling said second switch and adjusts a duty cycle of said PWM signal according to a sense signal indicative of a current through said LED.

5. The power supply system as claimed in claim 1, further comprising:
    an energy storage element coupled to said input terminal and said first switch,
    wherein a current through said LED flows to ground via said second switch when said second switch is on, and wherein a portion of said current through said LED flows through said energy storage element to charge said energy storage element when said second switch is off and said first switch is on.

6. The power supply system as claimed in claim 5, wherein said energy storage element is discharged to power said controller via said input terminal when said second switch is on, and wherein said energy storage element is also discharged to power said controller via said input terminal if both said first and second switches are off.

7. The power supply system as claimed in claim 5, wherein said energy storage element enters a steady state if said second switch is off and said first switch is on.

8. The power supply system as claimed in claim 1, wherein said controller is powered by said supply voltage received via said source of said first switch.

9. A method for controlling power to a light emitting diode (LED), said method comprising:
    providing power to said LED;
    adjusting said power to said LED by a first switch, wherein said first switch has a gate, a source and a drain;
    controlling a state of said first switch by a controller;
    providing a gate voltage to said gate of said first switch by a first control terminal of said controller;
    providing a source voltage to said source of said first switch by a second control terminal of said controller;
    receiving a supply voltage via said source of said first switch by an input terminal of said controller;
    limiting said supply voltage within a predetermined maximum level by regulating said gate voltage to a preset level; and
    controlling said state of said first switch by controlling a state of a second switch coupled to said first switch.

10. The method as claimed in claim 9, further comprising:
    sensing a current through said LED by a sense terminal of said controller.

11. The method as claimed in claim 9, wherein the step of controlling said state of said second switch comprises:
    generating a pulse-width modulation (PWM) signal to control said second switch; and
    adjusting a duty cycle of said PWM signal according to a sense signal indicative of a current through said LED.

12. The method as claimed in claim 9, further comprising:
    transferring a current through said LED to ground via said second switch when said second switch is on;
    charging an energy storage element by a portion of said current through said LED when said second switch is off and said first switch is on,
    wherein said energy storage element is coupled to said input terminal and said first switch.

13. The method as claimed in claim 12, further comprising:
    discharging said energy storage element to power said controller via said input terminal when said second switch is on; and
    discharging said energy storage element to power said controller via said input terminal if both said first and second switches are off.

14. A power supply system comprising:
    a power converter operable for providing power to a light emitting diode (LED);
    a first switch coupled to said power converter and operable for adjusting said power to said LED;
    an energy storage element coupled to said first switch; and
    a controller coupled to said first switch and operable for controlling a state of said first switch, and operable for limiting a supply voltage of said controller within a predetermined maximum level by regulating a gate voltage at a gate of said first switch to a preset level, said controller comprising:
        a second switch coupled to said first switch; and
        a control circuit coupled to said second switch and operable for controlling said second switch,
    wherein a current through said LED flows to ground via said second switch and said energy storage element is discharged to power said controller when said second switch is on, and wherein a portion of said current through said LED charges said energy storage element via said first switch when said first switch is on and said second switch is off.

15. The power supply system as claimed in claim 14, wherein said controller has a sense terminal for sensing said current through said LED.

16. The power supply system as claimed in claim 14, wherein said controller comprises a Zener diode coupled to said gate of said first switch and for regulating said gate voltage to said preset level.

17. The power supply system as claimed in claim 14, wherein said control circuit generates a pulse-width modulation (PWM) signal for controlling said second switch and adjusts a duty cycle of said PWM signal according to a sense signal indicative of said current through said LED.

18. The power supply system as claimed in claim 14, wherein said energy storage element is discharged to power said controller via said input terminal when said second switch is on, and wherein said energy storage element is also discharged to power said controller via said input terminal if both said first and second switches are off.

19. The power supply system as claimed in claim 14, wherein said energy storage element enters a steady state if said second switch is off and said first switch is on.

20. The power supply system as claimed in claim 14, wherein said controller receives said supply voltage via a source of said first switch.

\* \* \* \* \*